(12) United States Patent
Kardach et al.

(10) Patent No.: US 7,254,730 B2
(45) Date of Patent: *Aug. 7, 2007

(54) METHOD AND APPARATUS FOR A USER TO INTERFACE WITH A MOBILE COMPUTING DEVICE

(75) Inventors: James Kardach, Saratoga, CA (US); Jeffrey Huckins, Chandler, AZ (US); Kristoffer Fleming, Chandler, AZ (US); Brian Belmont, Portland, OR (US); Pochang Hsu, Fremont, CA (US); Venu Kuchibhotla, Campbell, CA (US); Richard Forand, Portland, OR (US); Uma Gadamsetty, Chandler, AZ (US); Gunner Danneels, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 10/367,076

(22) Filed: Feb. 14, 2003

(65) Prior Publication Data
US 2004/0163004 A1    Aug. 19, 2004

(51) Int. Cl.
G06F 1/26    (2006.01)

(52) U.S. Cl. .................. 713/323; 713/300; 713/320; 713/321; 713/324

(58) Field of Classification Search ................ 713/300, 713/320, 321, 323, 324; 345/52, 156, 21; 710/1, 8, 14, 19; 715/700, 719, 7, 748
See application file for complete search history.

(56) References Cited

U.S. PATENT DOCUMENTS 5,251,299 A    10/1993 Masuda et al.
5,432,462 A     7/1995 Obregon et al.

(Continued)

FOREIGN PATENT DOCUMENTS

DE    100 23 163 A1    11/2001

(Continued)

OTHER PUBLICATIONS

Compaq/Intel/Microsoft/Phoenix and Toshiba Corporation, "Advanced Configuration and Power Interface Specification", Revision 2.0a, Mar. 31, 2002, pp. 13-85.

(Continued)

Primary Examiner—Rehana Perveen
Assistant Examiner—Nitin C. Patel
(74) Attorney, Agent, or Firm—Blakely, Sokoloff, Taylor & Zafman LLP

(57) ABSTRACT

A method and apparatus for a user to interface with a mobile computing device is disclosed. In one embodiment, a method, comprises providing information on a user interface connected to a mobile computing device having a primary display, wherein the mobile computing device can be operated in multiple power states, and the user interface does not include the primary display

26 Claims, 6 Drawing Sheets

U.S. PATENT DOCUMENTS

| | | | |
|---|---|---|---|
| 5,446,906 A | 8/1995 | Kardach et al. | |
| 5,465,367 A | 11/1995 | Reddy et al. | |
| 5,560,001 A | 9/1996 | Kardach et al. | |
| 5,655,127 A | 8/1997 | Rabe et al. | |
| 5,657,483 A | 8/1997 | Kardach et al. | |
| 5,692,202 A | 11/1997 | Kardach et al. | |
| 5,860,016 A | 1/1999 | Nookala et al. | |
| 5,884,088 A | 3/1999 | Kardach et al. | |
| 5,936,442 A | 8/1999 | Liu | |
| 5,959,833 A | 9/1999 | Youens | |
| 5,983,073 A * | 11/1999 | Ditzik | 455/11.1 |
| 5,983,186 A * | 11/1999 | Miyazawa et al. | 704/275 |
| 6,014,751 A | 1/2000 | Kardach et al. | |
| 6,052,792 A | 4/2000 | Mensch, Jr. | |
| 6,065,121 A | 5/2000 | Hobson et al. | |
| 6,085,330 A | 7/2000 | Hewitt et al. | |
| 6,088,809 A | 7/2000 | Atkinson | |
| 6,098,175 A | 8/2000 | Lee | |
| 6,131,166 A | 10/2000 | Wong-Insley | |
| 6,222,507 B1 * | 4/2001 | Gouko | 345/1.1 |
| 6,240,521 B1 | 5/2001 | Barber et al. | |
| 6,289,464 B1 | 9/2001 | Wecker et al. | |
| 6,341,354 B1 | 1/2002 | Lee | |
| 6,360,327 B1 | 3/2002 | Hobson | |
| 6,385,734 B2 | 5/2002 | Atkinson | |
| 6,424,249 B1 | 7/2002 | Houvener | |
| 6,445,730 B1 | 9/2002 | Greszczuk et al. | |
| 6,477,655 B1 | 11/2002 | Delvaux et al. | |
| 6,502,003 B1 | 12/2002 | Jacobs et al. | |
| 6,535,985 B1 | 3/2003 | Oshima et al. | |
| 6,631,474 B1 | 10/2003 | Cai et al. | |
| 6,658,576 B1 | 12/2003 | Lee | |
| 6,675,233 B1 | 1/2004 | Du et al. | |
| 6,678,831 B1 | 1/2004 | Mustafa et al. | |
| 6,680,738 B1 | 1/2004 | Ishii et al. | |
| 6,697,953 B1 | 2/2004 | Collins | |
| 6,725,060 B1 * | 4/2004 | Chhatriwala et al. | 455/556.2 |
| 6,751,742 B1 | 6/2004 | Duhault et al. | |
| 6,760,850 B1 | 7/2004 | Atkinson et al. | |
| 6,785,786 B1 | 8/2004 | Gold | |
| 6,801,208 B2 | 10/2004 | Keshava et al. | |
| 6,801,974 B1 | 10/2004 | Watts et al. | |
| 6,803,810 B2 | 10/2004 | Yamada et al. | |
| 6,804,791 B2 | 10/2004 | Oshima et al. | |
| 6,835,850 B2 * | 12/2004 | Drent et al. | 560/207 |
| 6,836,850 B2 | 12/2004 | Cheng | |
| 6,848,057 B2 | 1/2005 | Hicok | |
| 6,868,460 B1 | 3/2005 | Kou | |
| 6,895,448 B2 * | 5/2005 | Chan et al. | 710/14 |
| 6,920,573 B2 | 7/2005 | Lee | |
| 6,938,176 B1 | 8/2005 | Alben et al. | |
| 7,062,647 B2 | 6/2006 | Nguyen et al. | |
| 7,080,271 B2 | 7/2006 | Kardach et al. | |
| 7,093,149 B2 | 8/2006 | Tsirkel et al. | |
| 7,114,090 B2 | 9/2006 | Kardach et al. | |
| 2002/0023237 A1 | 2/2002 | Yamada et al. | |
| 2002/0032877 A1 | 3/2002 | Iwaki | |
| 2002/0068610 A1 * | 6/2002 | Anvekar et al. | 455/560 |
| 2002/0085835 A1 | 7/2002 | Zhang et al. | |
| 2002/0086719 A1 * | 7/2002 | Kedia et al. | 455/574 |
| 2002/0129288 A1 | 9/2002 | Loh et al. | |
| 2002/0132603 A1 | 9/2002 | Lindskog et al. | |
| 2002/0173344 A1 | 11/2002 | Cupps et al. | |
| 2002/0178390 A1 | 11/2002 | Lee | |
| 2003/0115415 A1 * | 6/2003 | Want et al. | 711/115 |
| 2003/0126251 A1 | 7/2003 | Chen et al. | |
| 2003/0149903 A1 | 8/2003 | Chang | |
| 2003/0208550 A1 | 11/2003 | Hamilton et al. | |
| 2003/0208701 A1 | 11/2003 | Watari et al. | |
| 2004/0034802 A1 | 2/2004 | Hamilton | |
| 2004/0034803 A1 | 2/2004 | Hamilton | |
| 2006/0036887 A1 | 2/2006 | Kardach et al. | |
| 2006/0086719 A1 | 4/2006 | Suzuki et al. | |
| 2006/0143487 A1 | 6/2006 | Kardach et al. | |
| 2006/0184812 A1 | 8/2006 | Nguyen et al. | |
| 2006/0206627 A1 | 9/2006 | Kardach et al. | |

FOREIGN PATENT DOCUMENTS

| | | |
|---|---|---|
| EP | 0 810 510 A1 | 3/1997 |
| EP | 0945778 A2 | 9/1999 |
| EP | 1221645 A2 | 7/2002 |
| EP | 1 359 494 A2 | 5/2003 |
| WO | WO 01/15159 A1 | 3/2001 |
| WO | WO 01/61442 A1 | 8/2001 |
| WO | WO 01/61872 A2 | 8/2001 |
| WO | WO 02/080003 A2 | 10/2002 |
| WO | WO 2004/075000 A2 | 9/2004 |

OTHER PUBLICATIONS

Compaq/Intel/Microsoft/Phoenix and Toshiba, "Advanced Configuration and Power Interface Specification", Revision 2.0a, Mar. 31, 2002, Relevant Sections 2.2-2.6 (pp. 219-224), 3.2-3.4.4 (pp. 27-32), 4.3 (pp. 50-54) and 4.7.2.3 (p. 67).
U.S. Appl. No. 09/753,326, filed Dec. 29, 2000, Kedia et al.
U.S. Appl. No. 09/753,326, filed Dec. 29, 2000, Kedia et al.
U.S. Appl. No. 11/435,264, filed May 15, 2004, Kardach et al.
U.S. Appl. No. 11/402,527, filed Apr. 11, 2006, Nguyen et al.
PCT International Search Report and Written Opinion, PCT/US2004/000419, International filing date Jan. 8, 2004, mailing date Nov. 10, 2006 (12 pp.).

* cited by examiner

METHOD AND APPARATUS FOR A USER TO INTERFACE WITH A MOBILE COMPUTING DEVICE

FIELD OF THE INVENTION

This invention relates to computer software and hardware, and more specifically to a method and system for a user to interface with a mobile computing device.

BACKGROUND OF THE INVENTION

As electronic and computer technology continues to evolve, communication of information to a user at all times becomes increasingly important. For example, now more than ever users of personal digital assistants (PDAs) are continuously checking email, looking-up contacts, drafting documents on-the-go, and scheduling. Other users are utilizing mobile phones with built-in PDAs. In addition to these new devices, more and more users are using tablet PCs and notebook computers. The mobility of the powerful computing devices makes them ideal for the business traveler. A general computing system for a mobile device will now be described.

A. Computing System

FIG. 1 shows an embodiment of a mobile computing system 100. The computing system includes a Central Processing Unit (CPU) 101, a cache 102, a memory controller and bridge 103 and a system memory 104. Software instructions performed by the computing system (and its corresponding data) are stored in the system memory 104 and cache 102 (where frequently used instructions and data are stored in cache 102). The software instructions (together with corresponding data) are executed by the CPU 101. The memory controller portion of the memory controller and bridge function 103 is responsible for managing access to the system memory 104 (which may be used by functional elements other than the CPU 101 such as the graphics controller 105 and various I/O units).

The graphics controller 105 and display 106 provide the computer generated images observed by the user of the computing system 100. The bridge portion of the memory controller and bridge function 103 provides a system bus 107 that multiple Input/Output (I/O) units $108_1$ through $108_N$ may use to communicate with one another, the CPU 101, the system memory 104, etc. Here, I/O units are typically viewed as functional units that send/receive information to/from the computing system (e.g., a networking adapter, a MODEM, a wireless interface, a keyboard, a mouse, etc.) and/or function units used for storing information within the computing system 100 (e.g., a hard disk drive unit). Note that the depiction of FIG. 1 is exemplary and other computing system architectures are possible (e.g., multiprocessor computing systems, for example).

Notably other bus structures (not shown in FIG. 1 for simplicity), such as a Universal Serial Bus (USB) bus, may be used to couple a keyboard, mouse and other lower performance peripherals. Also, "parallel" and/or "serial" ports (again not shown in FIG. 1 for simplicity) may also be viewed as additional I/O units.

B. Computing System State Diagram

FIG. 2 shows a prior art state diagram for a computing system 100. An embodiment of the operating states observed in FIG. 2 may be found in the Advanced Configuration and Power Interface (ACPI) specification, Revision 2.0a dated Mar. 31, 2002 (and published by Compaq Computer Corporation, Intel Corporation, Microsoft Corporation, Phoenix Technologies Ltd., and Toshiba Corporation). Although the ACPI specification is recognized as describing a large number of existing computing systems, it should be recognized that large numbers of computing systems that do not conform to the ACPI specification can still conform to the operating state configuration observed in FIG. 2. As such, the description of FIG. 1 corresponds to a more generic description that the ACPI specification conforms to.

According to the depiction of FIG. 2 a first state 201, referred to as the "normal on" state 201, is the normal operating state of the computer (i.e., the state of the computer when it is actively powered and is being (or is ready to be) used by a user). The ACPI specification refers to the normal on state 201 as the "G0" state. A second state 202 refers to any of one or more states where the computing system is recognized as being "off". The ACPI specification recognizes two such states: a hardware based off state (e.g., where power has been removed from the entire system) and a software based off state (where power is provided to the system but the BIOS and operating system (OS) have to be reloaded from scratch without reference to the stored context of a previously operating environment). The ACPI specification refers to the hardware based off state as the "G3" state and the software based off state as the "G2" state.

A third state 203 refers to any of one or more states where the computing system is recognized as "sleeping". For sleep states, the operating environment of a system within the "normal on" state 201 (e.g., the state and data of various software routines) are saved prior to the CPU of the computer being entered into a lower power consumption state. The sleep state(s) 203 are aimed at saving power consumed by the CPU over a lull period in the continuous use of the computing system. That is, for example, if a user is using a computing system in the normal on state 201 (e.g., typing a document) and then becomes distracted so as to temporarily refrain from such use (e.g., to answer a telephone call)—the computing system can automatically transition from the normal on state 201 to a sleep state 202 to reduce system power consumption.

Here, the software operating environment of the computing system (e.g., including the document being written), which is also referred to as "context" or "the context", is saved beforehand. As a consequence, when the user returns to use the computing system after the distraction is complete, the computing system can automatically present the user with the environment that existed when the distraction arose (by recalling the saved context) as part of the transition back to the normal state 201 from the sleep state 203. The ACPI specification recognizes a collection of different sleep states (notably the "S1", "S2", "S3" and "S4" states each having its own respective balance between power savings and delay when returning to the "normal on" state 201 (here, the S1, S2 and S3 states are recognized as being various flavors of "standby" and the S4 state is a "hibernate" state).

A problem with prior art sleep states, however, is that the CPU is unable to perform any useful work. As such, although power savings are recognized, any tasks that may have been useful to perform during the time period over which the computing system was sleeping are impossible to implement.

Furthermore, most mobile devices are always carried on or near the user. Laptops are typically transported in cases and are essentially dead weight while users are moving. A similar situation occurs with tablet PC users.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
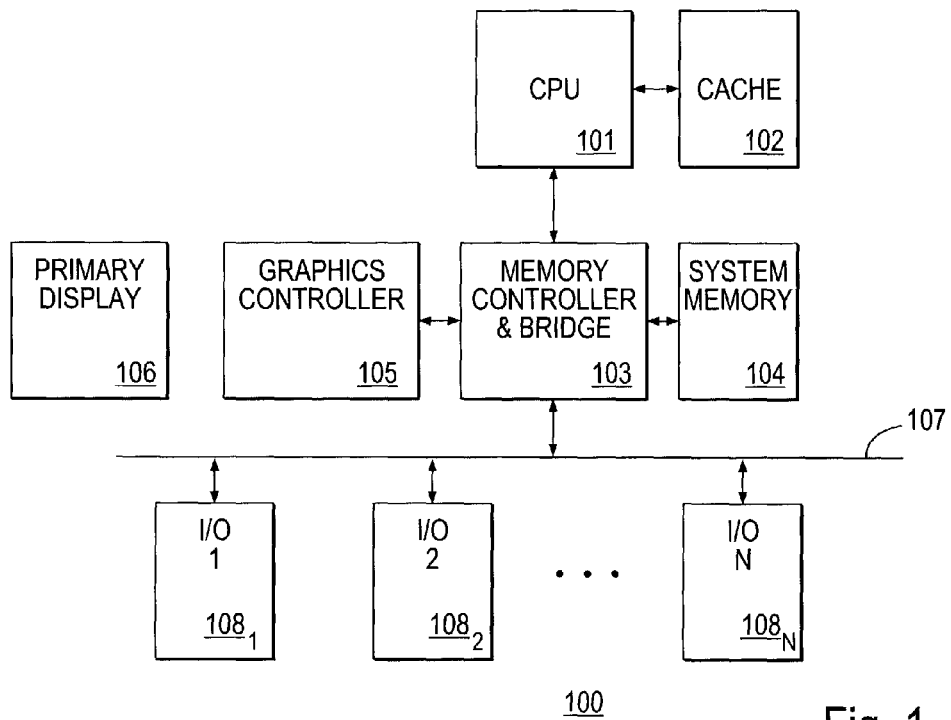
FIG. 1 illustrates a functional block diagram of a prior art mobile computing system.
Figure 2:
FIG. 2 illustrates a state diagram of the prior art mobile computing system.

A method and apparatus for a user to interface with a mobile computing device is disclosed. In one embodiment, a method, comprises providing information on a user interface connected to a mobile computing device having a primary display, wherein the mobile computing device can be operated in multiple power states, and the user interface does not include the primary display.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below.

Figure 3:
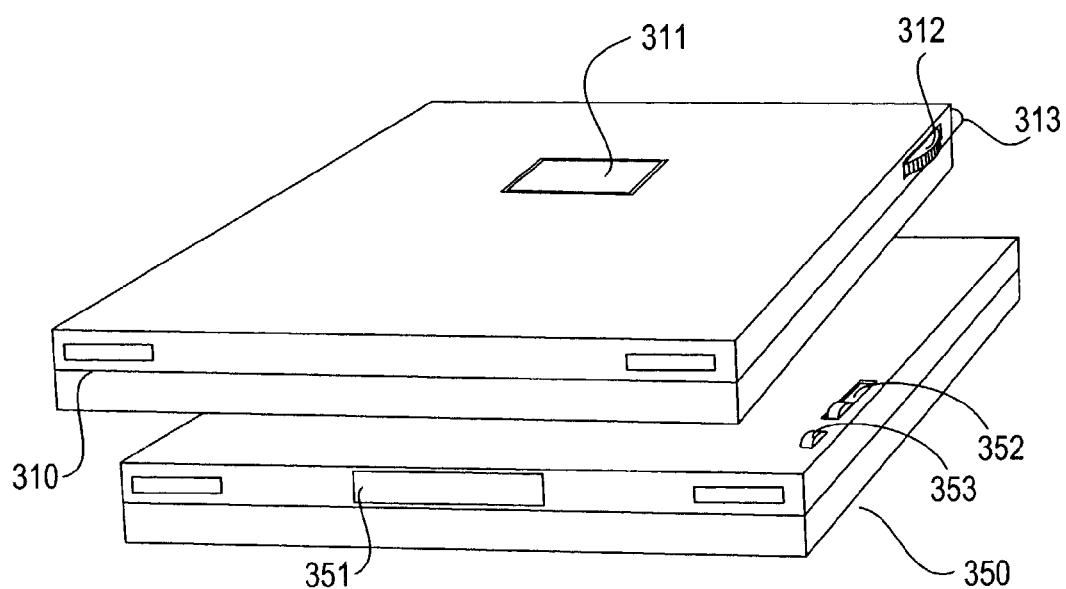
FIG. 3 illustrates two mobile computing devices in which elements of the present invention may be implemented.

FIG. 3 illustrates two mobile computing devices in which elements of the present invention may be implemented. Notebook computer 310 and notebook computer 350, include user interfaces according to one embodiment of the present invention. The user interfaces have a secondary display. The secondary display can have a touch screen, be black and white, color, LCD or plasma. The secondary display is generally smaller than the computing device's primary display. Notebook 310 has display 311 located on its back panel. Notebook 350 has display 351 located on an edge. An additional element of user interfaces are jog dials for aiding users in navigating through the displays. Notebook 310 has a jog dial 312 on its side edge and notebook 350 has a jog dial 352 on its back panel. User interfaces can also include switches 313 and 353 for aiding a user in making selections. Yet another element of a user interface is a microphone (not shown) for receiving user voice commands. Notebooks 310 and 350 can communicate through a wireless interface (not shown) with other wireless devices.

Figure 4:
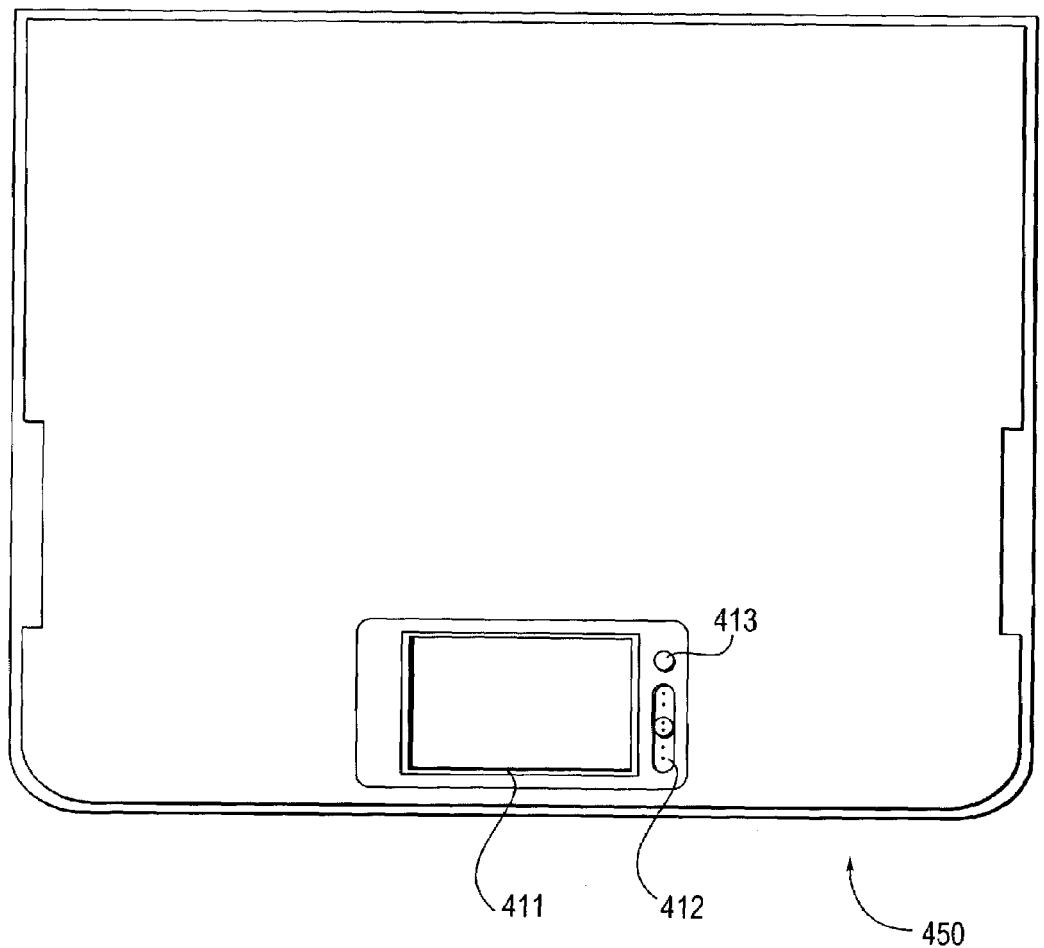
FIG. 4 illustrates another embodiment of a mobile computing device in which elements of the present invention may be implemented.

FIG. 4 illustrates another embodiment of a mobile computing device in which elements of the present invention may be implemented. Tablet PC 450 includes display 411, switch 413, and jog dial 412 as part of its user interface. Although shown on the back panel of tablet PC 400, the user interface can be located on any side or edge of tablet PC 400. Tablet PC 400 can also include a microphone (not shown) for receiving user voice commands. Additionally, tablet PC 450 can communicate with other wireless devices.

Figure 5:
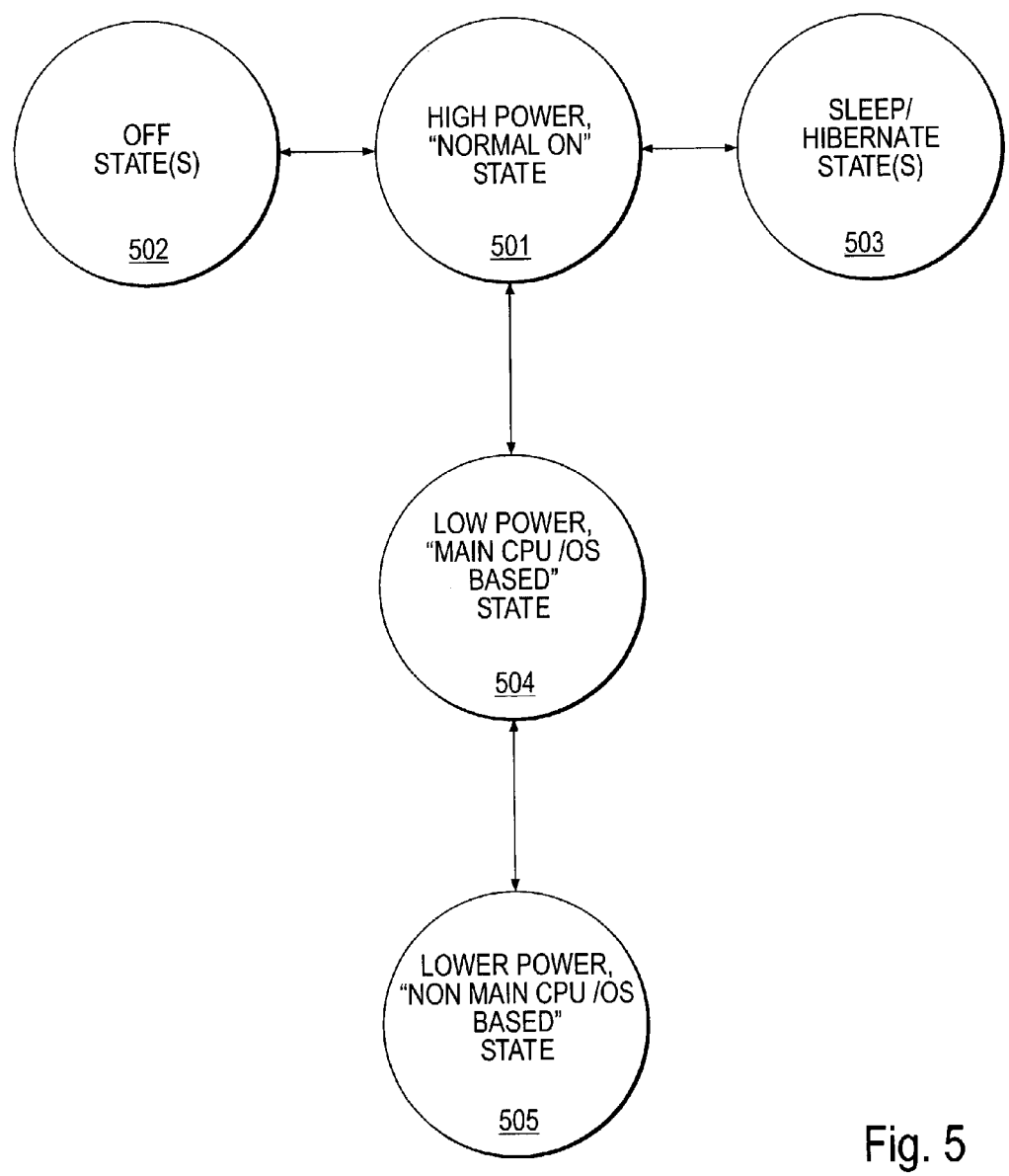
FIG. 5 illustrates an improved state diagram for a mobile computing system having useful low power operating states, according to one embodiment of the present invention.
Figure 6A:
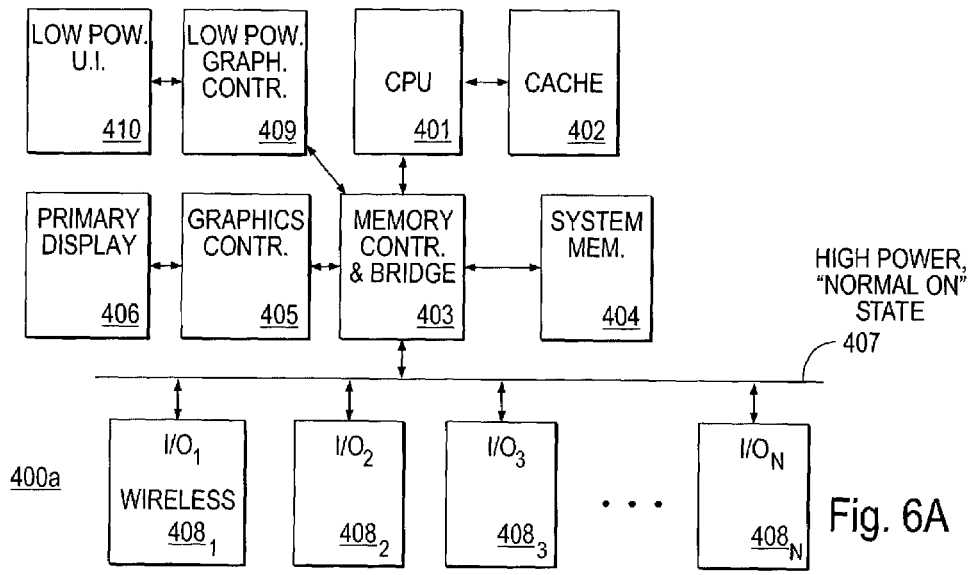
FIGS. 6A through 6C illustrate an embodiment of the relationship between hardware components of active and inactive computing systems for, a "normal on" state (FIG. 6A), a "main CPU/OS based low power" state (FIG. 6B), and a "non-main CPU/OS based lower power state (FIG. 6C).
Figure 6B:
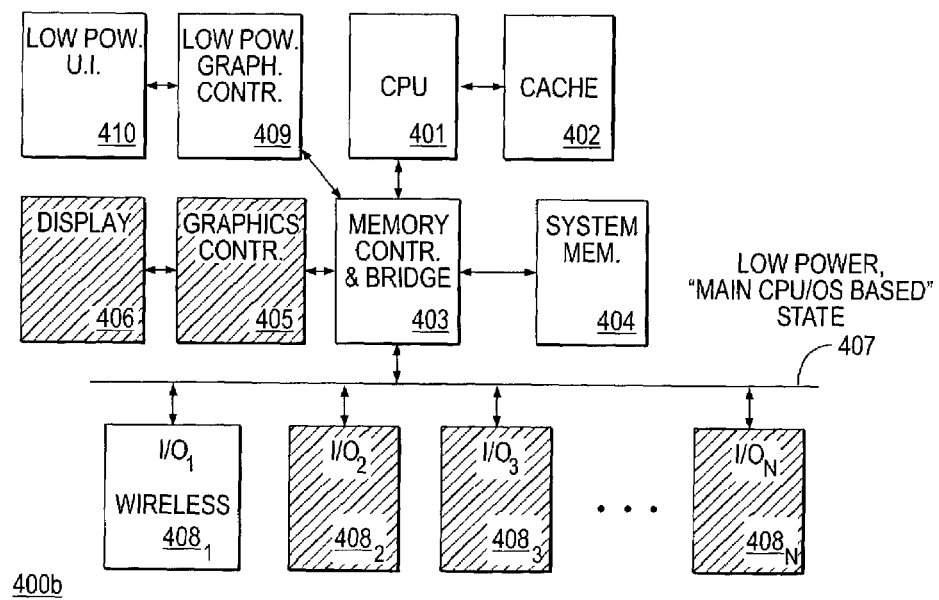
Figure 6C:
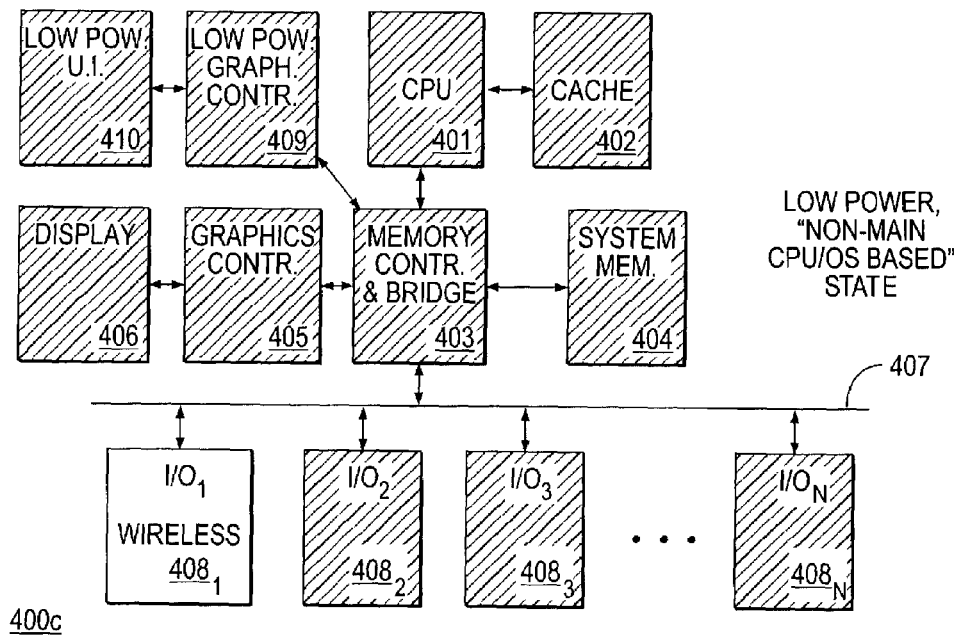

FIG. 5 illustrates an improved state diagram for a mobile computing system having useful low power operating states. According to the state diagram scheme observed in FIG. 5, a computing system has three primary states were useful tasks can be performed: 1) a high power, "normal on" state 501; 2) a "main CPU/OS based low power" state 504; and, 3) a non main CPU/OS based low power" state 505. FIGS. 6A through 6C show an exemplary embodiment of a single computing system for each of the above described states. That is, FIG. 6A shows an embodiment of computing system having all of its primary architectural components powered on during a normal on state 501; FIG. 6B shows an embodiment of those primary architectural components that are powered on and those primary architectural components that are powered on during the "main CPU/OS based low power" state 504 (where shaded regions are powered off and non shaded regions are powered on); and, FIG. 6C shows an embodiment of those primary architectural components that are powered on and those components that are powered off during the "non main CPU/OS based lower power" state 505 (where, again, shaded regions are powered off and non shaded regions are powered on).

Thus, referring to FIGS. 5 and 6A, the "normal on" state 501 corresponds to a standard "normal on" state in which the computing system is operational and all of its primary architectural components 401 through $408_{1-N}$ are powered on. As a consequence, the computing system can be viewed as being within a "high power" state because its primary architectural components are consuming power. Additionally, low-power graphics controller 409 and low-power user interface (UI) 410 are powered on during high power "Normal on" state 501. Low-power graphics controller 409 controls low power UI 410, that can be a display such as display 411. UI 410 can also include jog dials, switches, and microphones, as discussed above. Although low-power controller 409 is shown as a separate component, it can be integrated into graphics controller 405. Another characteristic of the "normal on" state is that controller 409 and UI 410 can be user activated and deactivated independent of other system components.

Another component powered on during high power "normal on" state 501, is wireless I/O 408, which includes a wireless receiver and transmitter, as will be discussed in greater detail below. Normal on state 501 is associated with the normal use of the mobile computing device, such as at a user's desk or on a phone. In the case of notebook and tablet PCs, they would be open and in use by the user.

Referring to FIGS. 5 and 6B, the "main CPU/OS based low power" state 504 corresponds to a state in which the main CPU 401 is powered on and can execute software; yet, primary architectural components (notably, the graphics controller 405, the display 406, and various I/O units $408_2$ through $408_N$ are powered down so that power consumption is reduced. Moreover, the main CPU 401 itself, although functional, may be configured so as to have reduced performance and reduced power consumption as compared to the normal on state 501. In an embodiment, this is achieved at least by lowering the frequency of the main CPU's clock speed as compared to the "normal on" state 501. As a consequence, the main CPU 401 has reduced processing speed, but, consumes less power.

Nevertheless, because the main CPU 401 remains active (so that it can execute software based on the computing system's main operating system (OS)), and because primary architectural components are powered down so as to reduce power consumption, state 504 is both "main CPU/OS based" and "low power". Hence, state 504 may be referred to as a "main CPU/OS based low power" state. In low power state 504, low-power graphics controller 409 and user interface 410 are powered-on. Low-power state 504 can be associated with a state of use of a notebook or tablet PC where they are closed and possibly packed away, or being transported. Additionally, wireless I/O $408_1$ is powered-on.

In normal on state 501 and low power state 504, additional functionality is provided to the user, which is especially useful if the user is mobile. By using UI 410, including any combination of display, jog dial, switch, and microphone, the user can access useful data while the system's lid is closed. By using the UI 410, the user can scroll through menus on the display showing frequently used data such as a calendar, date book, contacts, addresses, phone numbers, reminders, e-mail messages, pages, and enterprise data such as sales information or a pricing database. The UI 410 can be an integrated personal digital assistant (PDA) with a touch screen for user input.

Additionally, UI 410 can be used to control certain functions of the mobile computing device. For example, the user could scroll to a music function where they could select and play MPS files, or request the synchronization of the mail system with an enterprise database. UI 410 provides all of the control, and input necessary to run these features while the lid is closed and the computing device is mobile.

Referring to FIGS. 5 and 6C, the "non main CPU/OS based lower power" state 305 corresponds to a state in which the main CPU 401 is powered down so that it cannot execute software based upon the computing system's main OS. Note that the cache 402, the system memory 404, and at least the memory controller portion of the memory controller and bridge unit 403 may also be powered down (because they largely support the main CPU's 401 efforts to execute software). Because the main CPU is inactive and does not execute the main OS, and because the main CPU 401 and its supporting architectural components 402, 403, 404 are powered down, state 305 is both "non main CPU/OS based" (i.e., the useful functions performed in state 305 do not involve executing the computing system's OS on the main CPU 401) and "lower power" as compared to states 301 and 304. Hence, state 305 may be referred to as a "non main CPU/OS based lower power" state.

In lower power state 505, wireless I/O $408_1$ is still powered on, although low-power controller 409 and UI 410 are no longer powered-on. Wireless I/O $408_1$ can use many long and/or short range protocols.

While long-range wireless standards may be available and defined, the near proximity use of near and even co-located devices wants for the development of a short-range wireless standard.

One such short-range wireless standard that is in the process of being embraced is preliminarily known by the name of "Bluetooth." Bluetooth, which is only one example of a short-range wireless standard, is actually a combination of specialized computer chips and software. Bluetooth is the name for a technology specification for small form factor, low-cost, short-range radio links between mobile PDAs, PCs, mobile phones and other portable devices which is published by the Bluetooth SIG Inc (see www.bluetooth-.com) and standardized by the IEEE as 802.15.1. Bluetooth, for example, also offers speedy transmission of up to one megabyte per second, over 17 times as fast as a typical modem. One of the present Bluetooth specification restrictions is to limit the transmission range so that the resulting radiation pattern typically does not exceed 10 meters.

Additional short-range wireless standards include the IEEE 802.11 RF wireless standards: 802.11 HR, 802.11b, and 802.11@5 GHz standards. Other exemplary short-range wireless standards potentially useful with the present invention include: HiperLan, HiperLan II, HomeRF, SWAP, OpenAir, and other wireless protocols.

Figure 7:
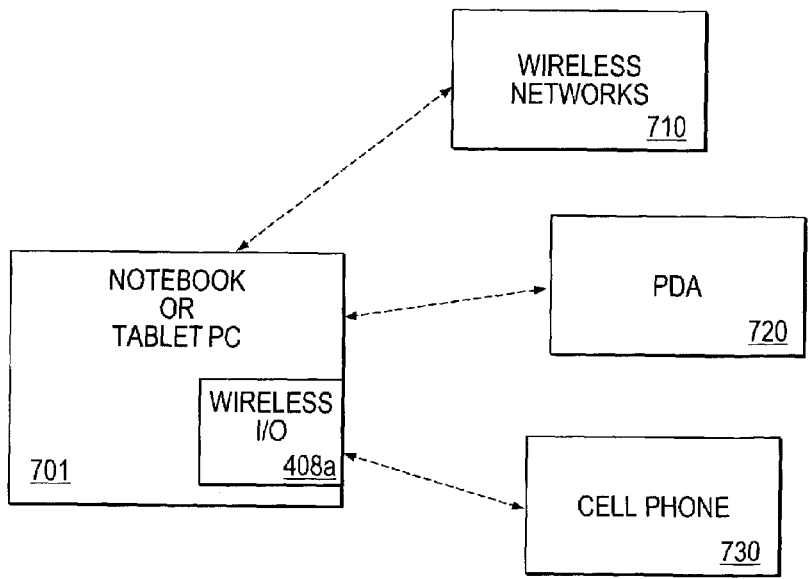
FIG. 7 illustrates a variety of wireless connections available to a mobile computing device, according to one embodiment of the present invention.

These wireless standards enable users to connect a wide range of computing and telecommunications devices easily and simply, without the need to buy, carry, or connect cables. FIG. 7 illustrates a variety of wireless connections available to a mobile computing device, according to one embodiment of the present invention. Notebook 701 in low power state 505 can establish wireless connections with wireless networks 710, PDAs 720, and/or cellular telephones 730, using wireless I/O $408_1$. The additional functionality described above is still available to the user through the user interfaces included on cell phones 730, PDAs 720 and wireless networks 710. For example, using a wireless headset, a user can query notebook 701 for a phone number. Similarly, PDA 720 can be used to display a reminder sent from a messaging program on notebook 701. Wireless I/O $408_1$ allows for rapid ad hoc connections, and the possibility of automatic, unconscious, connections between devices. For example, the mobile device 701 can scan the area for wireless network services 710 and then inform the user when they are in proximity of some desired service.

In another embodiment of lower power state 505, low-power controller 409 and UI 410 are powered on and perform the functions described above, in a non-main CPU/OS based state.

A method and system a user to interface with a mobile computing device is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A method, comprising:
providing information on a user interface connected to a mobile computing device having a primary display, wherein the mobile computing device can be operated in multiple power states, and wherein the user interface is presented on an output device other than the primary display; and
operating the mobile computing device in a low power state while providing the information to the user interface.

2. The method of claim 1, wherein the user interface is wirelessly connected to the mobile computing device.

3. The method of claim 1, further comprising: receiving commands from the user interface, wherein the user interface includes at least one of a microphone, a switch, a jog dial, a secondary display, and a headphone.

4. The method of claim 1, further comprising receiving the information from a wireless network.

5. The method of claim 2, further comprising: operating the mobile computing device in a lower power state while providing the information to the user interface wirelessly.

6. The method of claim 2, further comprising: receiving commands from the user interface, wherein the user interface includes at least one of a microphone, a switch, a jog dial, a secondary display, and a headphone.

7. The method of claim 2, wherein the user interface is one of a cellular phone and a personal digital assistant.

8. A computer-readable medium having stored thereon a plurality of instructions, said plurality of instructions when executed by a computer, cause said computer to perform:
providing information on a user interface connected to a mobile computing device having a primary display, wherein the mobile computing device can be operated in multiple power states, and wherein the user interface is presented on an output device other than the primary display;
further having stored thereon additional instructions, said additional instructions when executed by a said computer, cause said computer to further perform;
operating the mobile computing device in a low power state while providing the information to the user interface.

9. The computer-readable medium of claim 8, wherein the user interface is wirelessly connected to the mobile computing device.

10. The computer-readable medium of claim 8, having stored thereon additional instructions, said additional instructions when executed by a computer, cause said computer to further perform: receiving commands from the user interface, wherein the user interface includes at least one of a microphone, a switch, a jog dial, a secondary display, and a headphone.

11. The computer-readable medium of claim 8, having stored thereon additional instructions, said additional instructions when executed by a computer, cause said computer to further perform: receiving the information from a wireless network.

12. The computer-readable medium of claim 9, having stored thereon additional instructions, said additional instructions when executed by a computer, cause said computer to further perform: operating the mobile computing device in a lower power state while providing the information to the user interface wirelessly.

13. The computer-readable medium of claim 9, having stored thereon additional instructions, said additional instructions when executed by a computer, cause said computer to further perform: receiving commands from the user interface, wherein the user interface includes at least one of a microphone, a switch, a jog dial, a secondary display, and a headphone.

14. The computer-readable medium of claim 9, wherein the user interface is one of a cellular phone and personal digital assistant.

15. An apparatus, comprising:
a CPU (Central Processing Unit);
a memory controller connected to the CPU;
a primary display connected to the memory controller; and
a user interface connected to the memory controller, wherein the CPU, memory controller, and primary display operate in multiple states wherein the user interface receives information while the CPU is operated in a low power state.

16. The apparatus of claim 15, wherein the user interface is wirelessly connected to the mobile computing device.

17. The apparatus of claim 15, wherein the user interface receives information wirelessly while the CPU is operated in a lower power state.

18. The apparatus of claim 15, wherein the user interface includes at least one of a microphone, a switch, a jog dial, a secondary display, and a headphone.

19. The apparatus of claim 15, wherein the user interface receives information from a wireless network.

20. The apparatus of claim 16, wherein the user interface includes at least one of a microphone, a switch, a jog dial, a secondary display, and a headphone.

21. The apparatus of claim 16, wherein the user interface is one of a cellular phone and a personal digital assistant.

22. The apparatus of claim 18, further comprising a back plane connected to the primary display, wherein the secondary display is located on the back plane.

23. The apparatus of claim 18, further comprising a side plane perpendicularly connected to the primary display, wherein the secondary display is located on the side plane.

24. The apparatus of claim 18, wherein the secondary display is one of an LCD (liquid crystal display) and plasma display.

25. The apparatus of claim 18, wherein the secondary display is smaller than the primary display.

26. The apparatus of claim 18, further comprising a wireless transceiver compatible with one or more wireless protocols, wherein the wireless protocols include 802.11 HR, 802.11b, and 802.11a, 802.11g, Bluetooth, HiperLan, HiperLan II, HomeRF, SWAP, and OpenAir.

* * * * *